United States Patent
Kondo (10) Patent No.: US 10,089,563 B2
(45) Date of Patent: Oct. 2, 2018

(54) PRINTING APPARATUS, CONTROL METHOD OF PRINTING APPARATUS, AND STORAGE MEDIUM

(71) Applicant: CANON KABUSHIKI KAISHA, Tokyo (JP)

(72) Inventor: Yuichi Kondo, Abiko (JP)

(73) Assignee: Canon Kabushiki Kaisha, Tokyo (JP)

(*) Notice: Subject to any disclaimer, the term of this patent is extended or adjusted under 35 U.S.C. 154(b) by 73 days.

(21) Appl. No.: 15/415,499

(22) Filed: Jan. 25, 2017

(65) Prior Publication Data

US 2017/0220914 A1 Aug. 3, 2017

(30) Foreign Application Priority Data

Jan. 29, 2016 (JP) .................. 2016-016362

(51) Int. Cl.
| | | |
|---|---|---|
| B65H 37/04 | (2006.01) | |
| G03G 15/00 | (2006.01) | |
| G06K 15/00 | (2006.01) | |
| B41J 13/00 | (2006.01) | |

(52) U.S. Cl.
CPC ........ G06K 15/404 (2013.01); B41J 13/0009 (2013.01); B65H 37/04 (2013.01); G03G 15/6544 (2013.01); B65H 2301/51611 (2013.01); B65H 2301/51614 (2013.01); B65H 2301/51616 (2013.01); B65H 2301/541 (2013.01); B65H 2801/06 (2013.01)

(58) Field of Classification Search
CPC .................. B65H 2301/541; G03G 15/6544
See application file for complete search history.

(56) References Cited

U.S. PATENT DOCUMENTS

| 7,373,095 B2* | 5/2008 | Arai | G03G 15/5087 399/407 |
|---|---|---|---|
| 2013/0214470 A1* | 8/2013 | Yokomizo | B65H 39/10 270/1.01 |
| 2013/0328258 A1* | 12/2013 | Mutsuno | B42B 4/00 270/1.01 |
| 2014/0140747 A1* | 5/2014 | Osada | G03G 15/6544 399/410 |

FOREIGN PATENT DOCUMENTS

| JP | 2010-189101 A | 9/2010 |
|---|---|---|
| JP | 2013-170066 A | 9/2013 |

* cited by examiner

*Primary Examiner* — Jennifer Simmons
(74) *Attorney, Agent, or Firm* — Canon U.S.A., Inc. IP Division (57) ABSTRACT

A printing apparatus includes a control unit configured to control a printing unit to start printing on sheets after confirming that a number of sheets used for printing does not exceed an upper limit number of sheets bindable by a first binding processing in a case where the first binding processing is specified and control the printing unit to start printing on sheets without confirming that a number of sheets used for printing does not exceed an upper limit number of sheets bindable by a second binding processing in a case where the second binding processing is specified.

19 Claims, 9 Drawing Sheets

PRINTING APPARATUS, CONTROL METHOD OF PRINTING APPARATUS, AND STORAGE MEDIUM

BACKGROUND

Field of Art

The present invention relates to a printing apparatus which prints an image on a sheet.

Description of the Related Art

As a post-processing function executable by a printing apparatus, a printing apparatus may be provided with a staple binding function of binding a plurality of printed sheets by using a staple. Further, there is provided a printing apparatus having a staple-less binding function of binding sheets without using a binding member such as a staple (see Japanese Application Laid-Open No. 2010-189101). Furthermore, in recent years, there has been provided a printing apparatus having both of the staple binding function and the staple-less binding function (e.g., Japanese Application Laid-Open No. 2013-170066).

SUMMARY

Further, in order to improve the printing efficiency, there is a known technique in which a printing apparatus starts printing when image data necessary for printing a first page is generated instead of waiting for all of the image data used for printing to be generated.

Generally, an upper limit number of sheets (e.g., approximately five sheets at the maximum) bindable by the staple-less binding processing in which the sheets are bound without using a binding member such as a staple is less than that of the staple binding processing in which the sheets are bound by using a staple. Accordingly, when a user specifies the staple-less binding processing in which the sheets are bound without using a staple, the number of sheets is likely to exceed the upper limit number of sheets bindable thereby, and thus there is a high possibility of causing a situation in which the binding processing cannot be executed. On the other hand, generally, several tens of sheets can be bound by the above-described staple binding processing in which the sheets are bound by using the staple. Accordingly, when a user specifies the staple binding processing in which the sheets are bound by using a staple, the number of sheets is less likely to exceed the upper limit number of sheets bindable thereby, and thus a possibility of causing a situation in which the binding processing cannot be executed is lower than in the case of the staple-less binding processing.

Here, it is desirable that printing be stopped without outputting any of the sheets when the binding processing cannot be executed because the number of sheets to be printed exceeds the upper limit number of sheets bindable by the binding processing. In order to realize the above-described configuration, the printing apparatus may start printing the sheets after confirming that the number of sheets to be printed is equal to or less than the upper limit number of bindable sheets.

However, if the printing apparatus uniformly starts printing the sheets after confirming that the number of sheets to be printed is equal to or less than the upper limit number of bindable sheets when the binding processing is specified, there is a risk in which the convenience is rather lowered. For example, when the staple binding processing is specified, although a possibility of causing a situation in which the sheets cannot be bound is low, printing is on hold until it is confirmed that the number of sheets does not exceed the upper limit number of bindable sheets, and thus the printing efficiency will be lowered considerably.

On the other hand, when the staple-less binding processing is specified, a possibility of causing a situation in which the binding processing cannot be executed is relatively high. Therefore, even if the printing efficiency is lowered, it is preferable that printing be started after it is confirmed that the number of sheets does not exceed the upper limit number of bindable sheets.

The present disclosure is directed to providing a user-friendly printing apparatus capable of switching a print start timing according to the type of specified binding processing.

According to an aspect of the present disclosure, a printing apparatus according to the present disclosure includes a printing unit configured to print images on sheets, a generation unit configured to generate images used for printing, a first binding unit configured to execute first binding processing on sheets, a second binding unit configured to execute second binding processing on sheets, which is capable of executing binding processing on sheets of a number greater than an upper limit number of sheets bindable by the first binding processing, and a control unit configured to control the printing unit to start printing on sheets after confirming that a number of sheets used for printing does not exceed the upper limit number of sheets bindable by the first binding unit in a case where the binding processing executed by the first binding unit is specified, and control the printing unit to start printing on sheets without confirming that a number of sheets used for printing does not exceed an upper limit number of sheets bindable by the second binding unit in a case where the binding processing executed by the second binding unit is specified.

Further features of the present embodiment will become apparent from the following description of exemplary embodiments with reference to the attached drawings.

DESCRIPTION OF THE EMBODIMENTS

Hereinafter, an exemplary embodiment will be described in detail with reference to the appended drawings. Further, the embodiments described hereinafter are not intended to limit the content of the invention as described in the appended claims, and not all of the combinations of features described in the exemplary embodiments are required.

Figure 1:
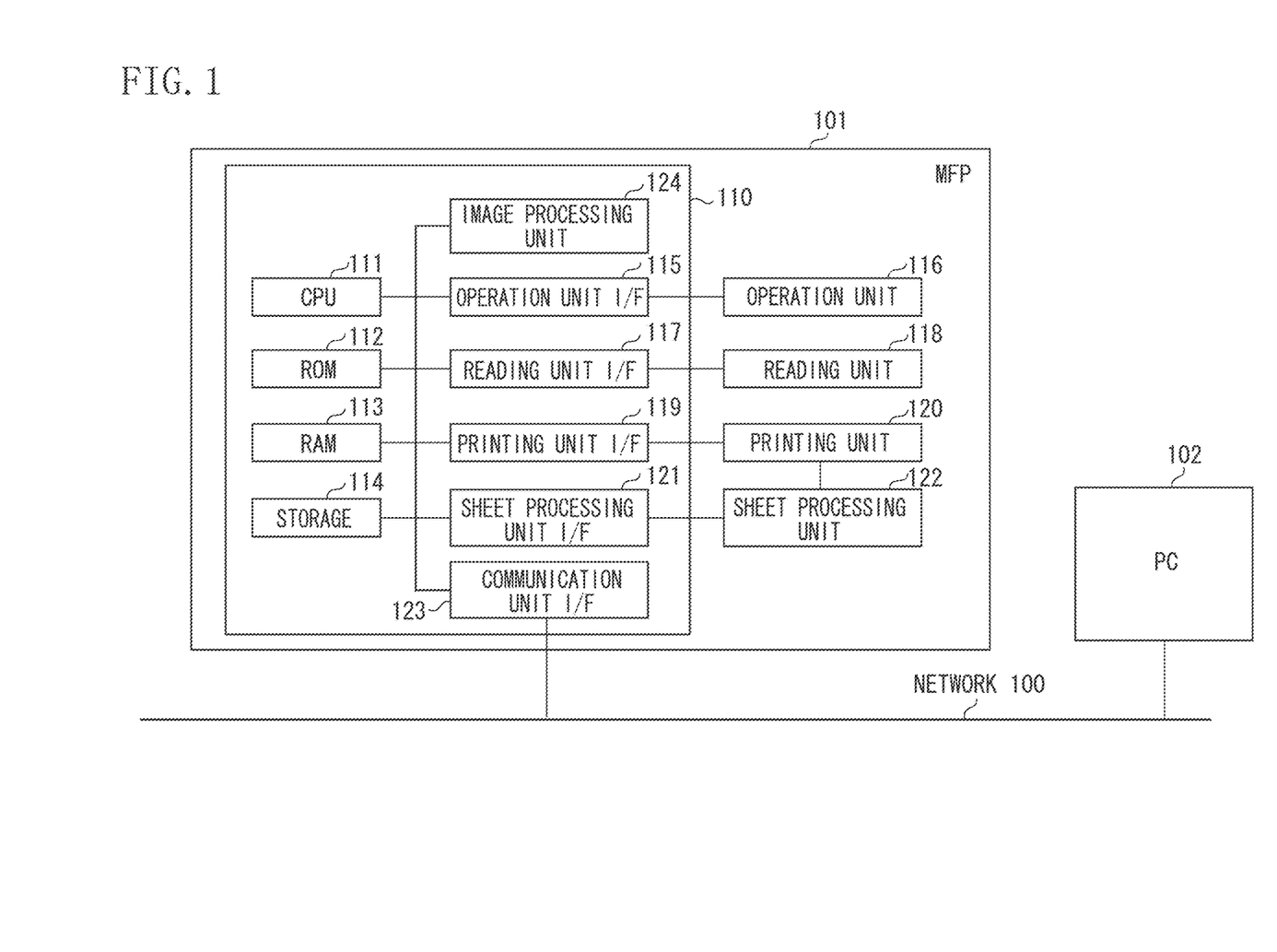
FIG. 1 is a block diagram illustrating a printing processing system.

FIG. 1 is a block diagram illustrating a printing processing system according to a first exemplary embodiment. In the present exemplary embodiment, a multifunction peripheral (MFP) 101 and a personal computer (PC) 102 will be described as respective examples of a printing apparatus and an information processing apparatus. The MFP 101 and the PC 102 are communicably connected to each other via a network 100.

In the present exemplary embodiment, although a printing processing system including the MFP 101 and the PC 102 will be described as an example, the present exemplary embodiment is not limited thereto. For example, only the MFP 101 may be referred to as the printing processing system.

First, the PC 102 will be described. The PC 102 can execute various programs such as application programs. Further, a printer driver having a function of converting print content into print data to be transmitted to the MFP 101 is installed in the PC 102. A user who would like to execute printing can provide a printing instruction through various applications. The printer driver installed in the PC 102 can convert data output by the application into print data readable by the MFP 101 based on the printing instruction, and transmit the print data to the MFP 101 connected to the network 100.

Next, the MFP 101 will be described. The MFP 101 has a reading function of reading an image on a sheet and a printing function of printing an image on a sheet. Further, the MFP 101 has a post-processing function of binding a plurality of sheets on which images are printed or aligning a plurality of sheets.

In the present exemplary embodiment, although the MFP 101 will be described as an example of the printing apparatus, the printing apparatus is not limited thereto. For example, the printing apparatus may be a single function peripheral (SFP) which does not have a reading function. In the present exemplary embodiment, a printing apparatus having various constituent elements described below will be given as an example.

A control unit 110 including a central processing unit (CPU) 111 controls an entire operation of the MFP 101. The CPU 111 reads a control program stored in a read-only memory (ROM) 112 or a storage 114 and executes various kinds of control such as reading control and printing control. The ROM 112 stores a control program that can be executed by the CPU 111. A random-access memory (RAM) 113 is a main memory of the CPU 111 and used as a work area or a temporary storage area for loading various control programs. The storage 114 stores image data, print data, various programs, and various kinds of setting information. In the present exemplary embodiment, although it is assumed that an auxiliary storage device such as a hard disk drive (HDD) is used as the storage 114, a non-volatile memory such as a solid-state drive (SSD) may be used instead of the HDD.

Further, in the MFP 101 of the present exemplary embodiment, although a single CPU 111 uses a single memory (i.e., RAM 113) to execute respective pieces of processing illustrated in below-described flowcharts, the present exemplary embodiment is not limited thereto. For example, respective pieces of processing illustrated in below-described flowcharts may be cooperatively executed by a plurality of CPUs, RAMs, ROMs, and storages. Further, a part of the processing may be executed by a hardware circuit such as an application specific integrated circuit (ASIC) or a field-programmable gate array (FPGA).

An operation unit interface (I/F) 115 connects an operation unit 116 and the control unit 110. The operation unit 116 includes a liquid crystal display unit having a touch panel function and various hard keys, so as to function as a display unit for displaying information and a receiving unit for receiving an instruction of a user.

A reading unit I/F 117 connects a reading unit 118 and the control unit 110. The reading unit 118 reads a document and generates an image. Further, the generated image is stored in the storage 114. The image generated by the reading unit 118 is transmitted to an external apparatus or printed on a sheet.

A printing unit I/F 119 connects a printing unit 120 and the control unit 110. An image used for printing is transferred from the control unit 110 to the printing unit 120 via the printing unit I/F 119. The printing unit 120 receives a control command and an image to be used for printing via the control unit 110, and prints the image on a sheet.

A sheet processing unit I/F 121 connects a sheet processing unit 122 and the control unit 110. The sheet processing unit 122 receives a control command via the control unit 110, and executes post-processing on a sheet printed by the printing unit 120 according to the control command. For example, the sheet processing unit 122 executes post-processing for binding a plurality of sheets. Further, post-processing function or post-processing capacity provided by the sheet processing unit 122 is notified to the control unit 110 via the sheet processing unit I/F 121 in advance (e.g., when the MFP 101 is activated), so as to be notified to the storage 114 or the RAM 113. In the present exemplary embodiment, the sheet processing unit 122 can execute at least binding processing for binding sheets by using a binding member such as a staple (hereinafter, referred to as "staple binding processing") and binding processing for binding sheets without using the binding member (hereinafter, referred to as "staple-less binding processing").

Further, the control unit 110 is connected to the network 100 via a communication unit I/F 123. The CPU 111 transmits images and information to an external apparatus connected to the network 100 or receives print data and information from an information processing apparatus connected to the network 100 via the communication unit I/F 123.

An image processing unit 124 executes image processing on an image read by the reading unit 118 or an image to be transferred to the printing unit 120. The image processing unit 124 can read an image stored in the storage 114 or the RAM 113 and execute rotation processing, layout processing, and scaling processing of the image. In the present exemplary embodiment, although it is assumed that the image processing unit 124 is realized with a hardware circuit such as an ASIC or an FPGA, the present exemplary embodiment is not limited thereto. For example, the MFP 101 may further include an image processing processor, so that the image processing processor realizes the image processing with respect to the image by executing an image processing program. In this case, the image processing processor and the CPU 111 cooperatively realize the flowcharts described below. Further, the CPU 111 may execute the image processing on the image by executing a program for executing the image processing. Further, the image processing may be executed by combining any of the above-described configurations.

Figure 2:
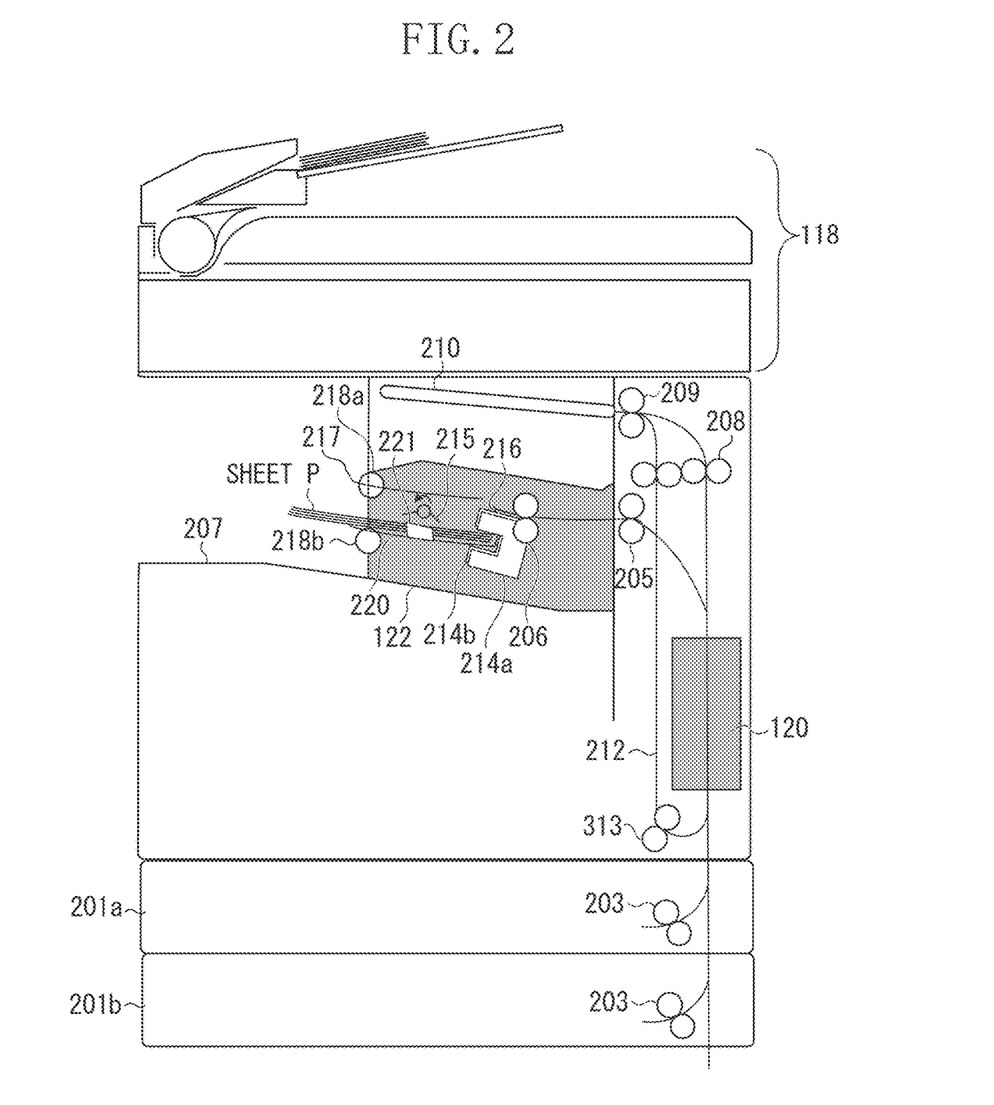
FIG. 2 is a diagram illustrating an operation unit.

Subsequently, the printing unit 120 will be described. FIG. 2 is a diagram illustrating a cross-sectional view of the MFP 101. The MFP 101 is broadly configured as the printing unit 120 for printing an image on a sheet (e.g., a plain paper, a thick paper, or a transparency film) and the reading unit 118 for reading a document and generating an image. First, printing processing and post-processing executed on a sheet will be described. In FIG. 2, the sheet processing unit 122 is arranged inside of the housing of the MFP 101 as an inner finisher. However, the arrangement of the sheet processing unit 122 is not limited to the example illustrated in FIG. 2. For example, the sheet processing unit 122 may be adjacently connected to the MFP 101.

A storing unit 201 includes two cassettes 201a and 201b, and the cassettes 201a and 201b can store sheets of the same type or size, or respective sheets of different types or sizes.

A feeding roller 203 feeds a sheet stored for each of the cassettes 201a and 201b to the printing unit 120. The printing unit 120 prints an image on a first face of the fed sheet. Further, the printing unit 120 may execute printing through an electrophotographic printing method or an ink jet printing method. Furthermore, a printing method other than the above can be also employed.

When one-sided printing is executed, a sheet printed by the printing unit 120 is guided by conveyance rollers 205 and 206, so as to be conveyed to the sheet processing unit 122 and discharged to an intermediate tray 220. When two-sided printing is executed, a sheet on which printing is executed on the first face by the printing unit 120 is guided by conveyance rollers 208, so as to be conveyed to an inversion path 210. When a trailing end of the sheet has reached a place in a vicinity of conveyance rollers 209, the conveyance rollers 209 start rotating in a reverse direction, so that the sheet is conveyed in a direction of the printing unit 120 via a conveyance path 212 for two-sided printing. After the printing unit 120 prints an image on the second face of the sheet, the sheet on which two-sided printing is executed is guided by the conveyance rollers 205 and 206, so as to be discharged to the intermediate tray 220.

The intermediate tray 220 is disposed in an inclined state in which a downstream side portion (left side portion in FIG. 2) thereof in a sheet conveyance direction is positioned on the upper side in a vertical direction whereas an upstream side portion (right side portion in FIG. 2) thereof in the sheet conveyance direction is positioned on the lower side in the vertical direction, so that a plurality of sheets can be stored thereby. Further, the intermediate tray 220 includes a bundle discharge roller pair 218 configured as a pair of upper and lower bundle discharge rollers 218a and 218b arranged on the downstream side and a drawing paddle 215 arranged on the upper side in an intermediary portion thereof. The upper bundle discharge roller 218a is supported by a guide 217.

This guide 217 is movable in an up-down direction by a motor (not illustrated). Therefore, the upper bundle discharge roller 218a arranged on the guide 217 is contactable to and separable from the lower bundle discharge roller 218b according to the up-down movement of the guide 217. Accordingly, a space between the bundle discharge roller pair 218 can be adjusted according to the thickness of the bundle of sheets stored in the intermediate tray 220.

In a state where the guide 217 is moved upward, the CPU 111 causes a sheet P discharged by the conveyance roller 206 to be stacked on the intermediate tray 220.

Further, respective alignment members 221 are arranged on a near side and a far side in a width direction orthogonal to a sheet conveyance direction of the intermediate tray 220. The alignment members 221 are moved in the width direction by a motor (not illustrated). Here, "near side" refers to a portion near to a sheet surface of FIG. 3, whereas "far side" refers to a portion far from the sheet surface in a depth direction thereof when the MFP 101 is viewed from the orientation illustrated in FIG. 3. The drawing paddle 215 rotates about a rotating shaft in a direction in which the sheet is pressed toward a stopper 216 (i.e., counterclockwise direction in FIG. 2).

The sheet discharged to the intermediate tray 220 slides down a stacking face of the intermediate tray 220 or a sheet stacked on the intermediate tray 220 because of the inclination of the intermediate tray 220 and a sheet pressing force applied from the drawing paddle 215. The sheet discharged to the intermediate tray 220 is aligned by the alignment members 221 while sliding down and being stopped when a trailing end of the sheet abuts on the stopper 216.

A sheet bundle aligned on the intermediate tray 220 is bound by a staple binding unit 214a or a staple-less binding unit 214b as necessary. The staple binding unit 214a or the staple-less binding unit 214b can bind a rear end portion in a conveyance direction of the sheet bundle stored in the intermediate tray 220. In the present exemplary embodiment, although the sheet bundle is bound at the rear end portion in the conveyance direction thereof, the exemplary embodiment is not limited thereto, and the sheet bundle stored in the intermediate tray 220 may be bound at a leading end portion in the conveyance direction thereof.

The staple binding unit 214a executes binding processing by pushing a metallic staple wire (not illustrated) into a sheet bundle. For example, a sheet bundle of up to fifty sheets can be bound by the staple binding processing to be executed by the staple-binding unit 214a. On the other hand, the staple-less binding unit 214b executes binding processing by applying a pressure force to a sheet bundle so as to pressurize and tangle the fibers of the sheets. Accordingly, the staple-less binding unit 214b can execute binding processing without using a binding member. For example, a sheet bundle of up to five sheets can be bound by the staple-less binding processing to be executed by the staple-less binding unit 214b.

In the present exemplary embodiment, an upper limit number of sheets bindable by the staple binding processing in which the sheets are bound by the staple binding unit 214a is assumed as fifty sheets. Further, an upper limit number of sheets bindable by the staple-less binding processing in which the sheets are bound by the staple-less binding unit 214b is assumed as five sheets. These upper limit numbers of sheets are stored in the storage 114. In addition, the upper limit numbers of sheets are not limited to the above. For example, the upper limit number of sheets may vary in types or grammages of the sheets used for printing. For example, if the sheets are thin papers, the upper limit number of sheets bindable by the staple binding processing may be set to seventy sheets. Further, for example, the upper limit number of thin sheets bindable by the staple-less binding processing may be set to seven sheets. In this case, the upper limit number of bindable sheets is stored with respect to each of the types or the grammages of the sheets. Further, the user may be allowed to change the upper limit number of sheets bindable by the staple-less binding processing or the staple binding processing.

Furthermore, in the present exemplary embodiment, although the staple-less binding unit 214b configured to bind sheets by pressurizing the fibers of the sheets has been described as an example, the present exemplary embodiment is not limited thereto. For example, a cut portion and a tongue-shaped portion may be formed on a part of the sheet bundle, and the sheets may be bound by inserting a leading end of the tongue-shaped portion into the cut portion. Further, toner used for printing may be used as adhesive toner for binding the sheets, and the sheets are bound with welded toner by applying heat and pressure to a portion where the adhesive toner is applied.

The sheet bundle on which post-processing such as the binding processing is executed by the sheet processing unit 122 is discharged to a discharge portion 207. Specifically, the guide 217 is moved to make the upper bundle discharge roller 218a abut on the uppermost sheet stacked on the intermediate tray 220, and the bundle discharge roller pair 218 is driven and rotated while the upper bundle discharge roller 218a is abutting on the sheet, so that the post-processed sheet bundle is discharged to the discharge portion 207.

Figure 3:
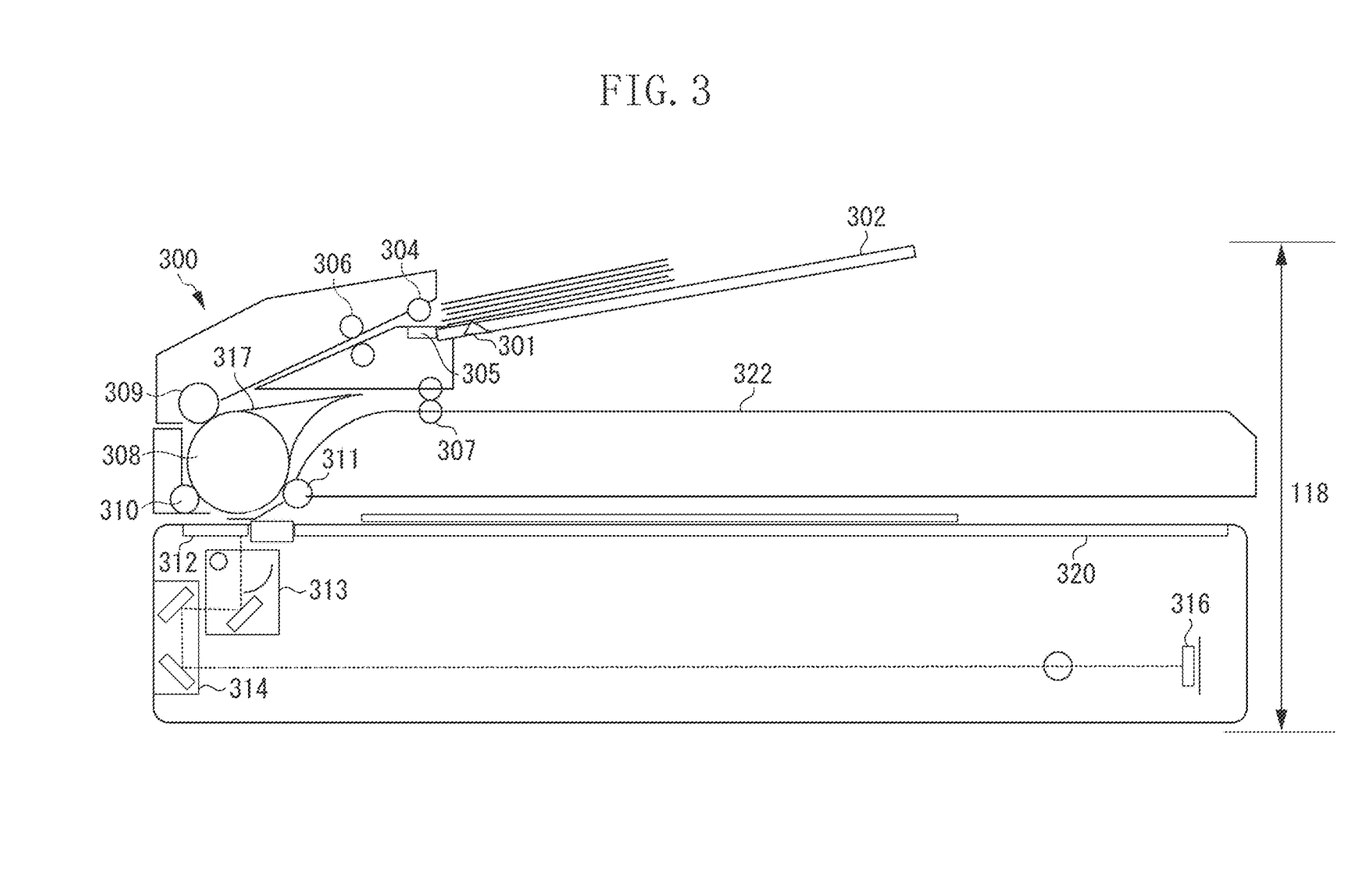
FIG. 3 is a diagram illustrating a cross-sectional view of a multifunction peripheral (MFP).

Subsequently, reading processing to be executed by the reading unit 118 will be described with reference to FIG. 3. FIG. 3 is a diagram illustrating a cross-sectional view of the reading unit 118. In the present exemplary embodiment, documents set on a document setting unit (also referred to as "document tray") 302 are conveyed by a document conveyance unit (also referred to as "auto document feeder (ADF)") 300, so that the reading unit 118 can read the documents conveyed thereto. Further, in the present exemplary embodiment, description will be given to an exemplary embodiment in which a CPU (not illustrated) that executes control of the reading unit 118 cooperates with the CPU 111 to control the conveyance of documents to be executed by the ADF 300.

The ADF 300 includes a separation roller 304 and a separation pad 305 for supplying a document from a bundle of documents set on the document tray 302 to the conveyance path. The bundle of documents is individually separated by a frictional force of the separation roller 304 and the separation pad 305. Further, a document detection sensor 301 is provided on the document tray 302. A setting state of the documents on the document tray 302 can be detected by the document detection sensor 301.

A separated document is conveyed to a platen 312 via rollers 301, 306, 308, and 309. Then, the document that is conveyed while being brought into contact with the platen 312 is further conveyed by rollers 311 and 307, so as to be discharged to a discharge tray 322.

Further, the reading unit 118 starts reading a first face of the document at a timing at which a leading end of the document conveyed from the document tray 302 reaches a reading position on the platen 312. When a time for starting the reading processing has come, the reading unit 118 turns on a light source within an optical unit 313 to emit light to the document passing a surface of the platen 312. The light reflected from the document enters a line sensor 316 via a plurality of mirrors within the optical unit 313 and a mirror unit 314. The line sensor 316 converts the light reflected from the document into an electric signal. For example, a charge-coupled device (CCD) image sensor is used as the line sensor 316. The electric signal is converted into an image through an analog/digital (A/D) converter (not illustrated) and stored in the storage 114 of the control unit 110.

Next, processing for reading both sides of the document will be described. When the reading unit 118 reads both sides of the document, the reading unit 118 switches a rotation direction of the roller 307 to the opposite direction after reading a first face of the document, so that the document is guided in a direction of an inversion path 317 instead of being discharged to the discharge tray 322. The reading unit 118 reads a second face of the document conveyed in a direction of the inversion path 317 in a same manner as in the first face, and generates an image corresponding to the second face. The document that has passed though the reading position is conveyed by the rollers 311 and 307, so as to be discharged to the discharge tray 322.

When a bundle of documents of a plurality of pages is to be read consecutively, the reading unit 118 generates images of the plurality of pages by repeatedly executing the above-described processing.

Further, the reading unit 118 can read a document that is set to a predetermined position of the document plate 320 with an image face thereof as a reading target facing downward. In order to read the document set to the document plate 320, the reading unit 118 moves the optical unit 313 and the mirror unit 314 at a predetermined speed to read an image of the set document.

Next, a copy function according to the present exemplary embodiment will be described. In the present exemplary embodiment, a copy function will be described as an example of the function of printing an image on a sheet. The copy function is a function of printing on a sheet an image read and acquired from a document.

Figure 4:
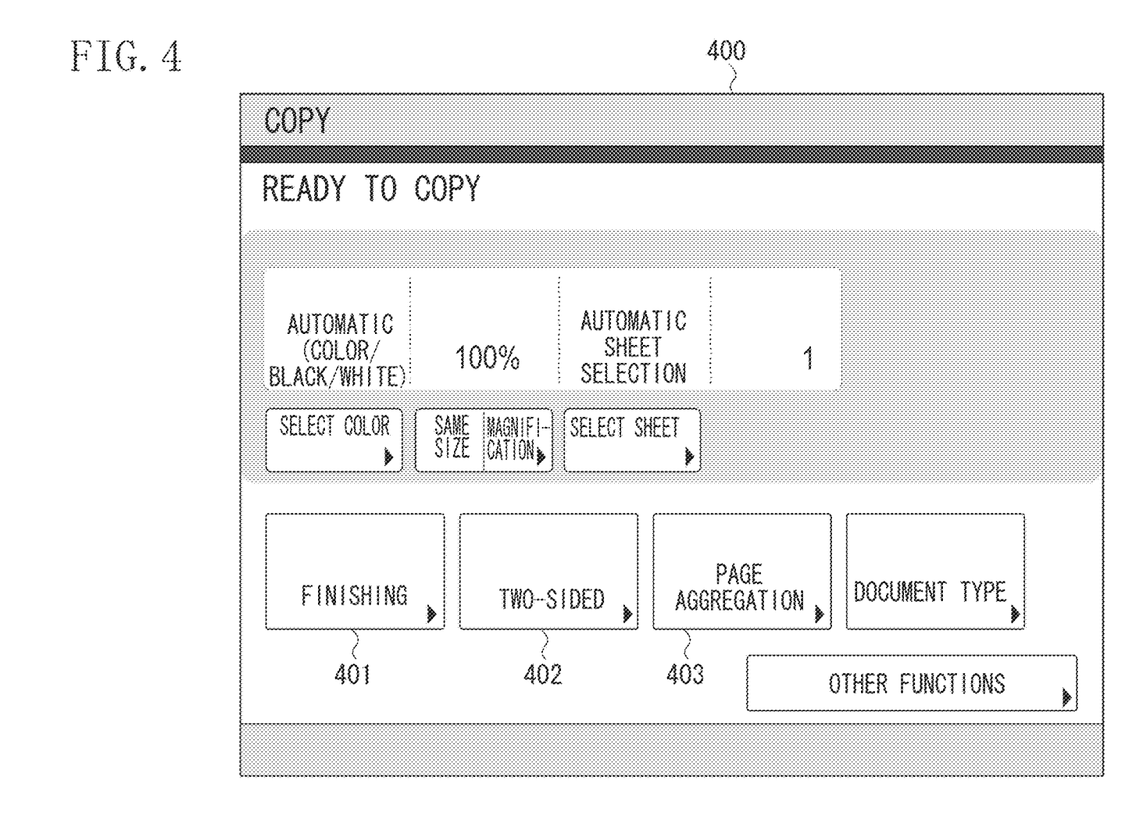
FIG. 4 is a diagram illustrating an operation screen displayed on the operation unit.

FIG. 4 is a diagram illustrating an example of a copy setting screen displayed on the operation unit 116. A setting screen 400 illustrated in FIG. 4 is an example of an initial screen of the copy function. A user who uses the MFP 101 can select the copy function from a main screen (not illustrated) displayed on the operation unit 116. The CPU 111 displays the setting screen 400 when a user presses a copy function key displayed on the main screen.

The user can perform various copy settings via the setting screen 400. For example, the user can perform various settings such as a setting of a number of print copies, a setting of black/white printing or color printing, a setting of two-sided printing, and a setting of page aggregation. In addition, the copy setting includes a large number of setting items which are not illustrated in FIG. 4. Therefore, it is difficult to perform all of the settings through a single screen. Accordingly, the user performs setting of respective items by shifting the screen to a setting screen separately provided for each of the setting items.

A finishing key 401 is used when post-processing is executed on a printed sheet. The user can specify the post-processing with respect to the printed sheet by pressing the finishing key 401. In the present exemplary embodiment, the user can specify staple binding processing or staple-less binding processing as the post-processing.

Further, a two-sided key 402 is used when two-sided printing is executed. The user can set whether to execute printing on one side or both sides of the sheet by pressing the two-sided key 402. Further, a page aggregation key 403 is a setting key for aggregating and printing a plurality of documents on one sheet by reducing the size of the documents. By pressing the page aggregation key 403, the user can set "two-in-one" in which two pages of documents are aggregated and printed on one sheet or "four-in-one" in which four pages of documents are aggregated and printed on one sheet.

The CPU 111 stores the setting input through the copy setting screen in the RAM 113 as a print setting, and executes a copy job according to the print setting stored in the RAM 113 when a start key (not illustrated) is selected.

In order to improve the printing efficiency, there is a known method in which the printing apparatus starts printing the sheets before completing the reading processing of all of the documents to be printed on the sheets when the copy job is executed. In the present exemplary embodiment, normally, in order to improve the printing efficiency, the printing apparatus is also controlled so as to start printing the sheets before completing the reading processing of all of the documents to be printed on the sheets.

Here, in a case where binding processing is specified as a print setting, the printing apparatus executes the binding processing on a plurality of sheets on which images are printed after printing the images thereon.

An upper limit number of sheets (e.g., approximately five sheets) bindable by the staple-less binding processing in which the sheets are bound by the staple-less binding unit 214b is less than that of the staple binding processing in which the sheets are bound by the staple binding unit 214a. Accordingly, when a user specifies the staple-less binding processing, the number of sheets is likely to exceed the upper limit number of sheets bindable thereby, and thus a possibility of causing a situation in which the binding processing cannot be executed is assumed to be high.

As described above, when copy or printing processing is executed, it is desirable for the user to stop printing without outputting any of the sheets in a case where a desired output cannot be acquired because the number of sheets to be output exceeds the upper limit number of post-processible sheets.

However, it is difficult to stop printing without outputting any of the sheets if the printing apparatus is controlled so as to start printing the sheets before completing the reading processing of all of the documents to be printed on the sheets in order to improve the printing efficiency.

On the other hand, several tens of sheets can be bound by the above-described staple binding. Accordingly, when a user specifies the staple binding processing in which the sheets are bound by using a staple, the number of sheets is less likely to exceed the upper limit number of sheets bindable thereby, and thus a possibility of causing a situation in which the binding processing cannot be executed is lower than in the case of the staple-less binding processing.

Here, in order to stop printing without outputting any of the sheets, the printing apparatus may be controlled so as to start printing the sheets after confirming that the number of the sheets to be printed is equal to or less than the upper limit number of bindable sheets.

However, if the printing apparatus is controlled as described above, even in a case where the staple binding processing is to be executed, the printing apparatus starts printing the sheets after confirming that the number of sheets to be printed is equal to or less than the upper limit number of sheets bindable thereby. For example, if the upper limit number of sheets bindable by the staple binding processing is fifty sheets, execution of printing is delayed until the images to be printed on the maximum of fifty sheets are generated. Accordingly, although there is a low possibility of causing a situation in which the binding processing cannot be executed, the printing efficiency is lowered, and thus the convenience of the user will be lowered.

On the other hand, when the staple-less binding processing is executed, the upper limit number of bindable sheets is approximately five sheets. Accordingly, the number of sheets to be printed is likely to exceed the upper limit number of bindable sheets, and thus there is a high possibility of causing a situation in which the binding processing cannot be executed.

In this case, convenience of the user can be improved if printing is stopped without outputting any of the sheets when the number of sheets to be printed exceeds the upper limit number of bindable sheets. Here, when the upper limit number of sheets bindable by the staple-less binding processing is five sheets, whether the number of sheets to be printed is equal to or less than the upper limit number of sheets can be confirmed if the printing processing is on hold until the images to be printed on five sheets at the maximum are generated. Accordingly, even if the printing apparatus is controlled so as to start printing after confirming that the number of sheets to be printed is equal to or less than the upper limit number of bindable sheets, a period in which the printing processing is on hold is shorter than in a case of executing the staple binding processing.

In consideration of the above situation, in the present exemplary embodiment, description will be given to an exemplary embodiment in which a timing at which printing is started is switched depending on whether to execute the staple binding processing in which the sheets are bound by the staple binding unit 214a or the staple-less binding processing in which the sheets are bound by the staple-less binding unit 214b. A specific printing control method will be described with reference to the below-described flowcharts.

Figure 5:
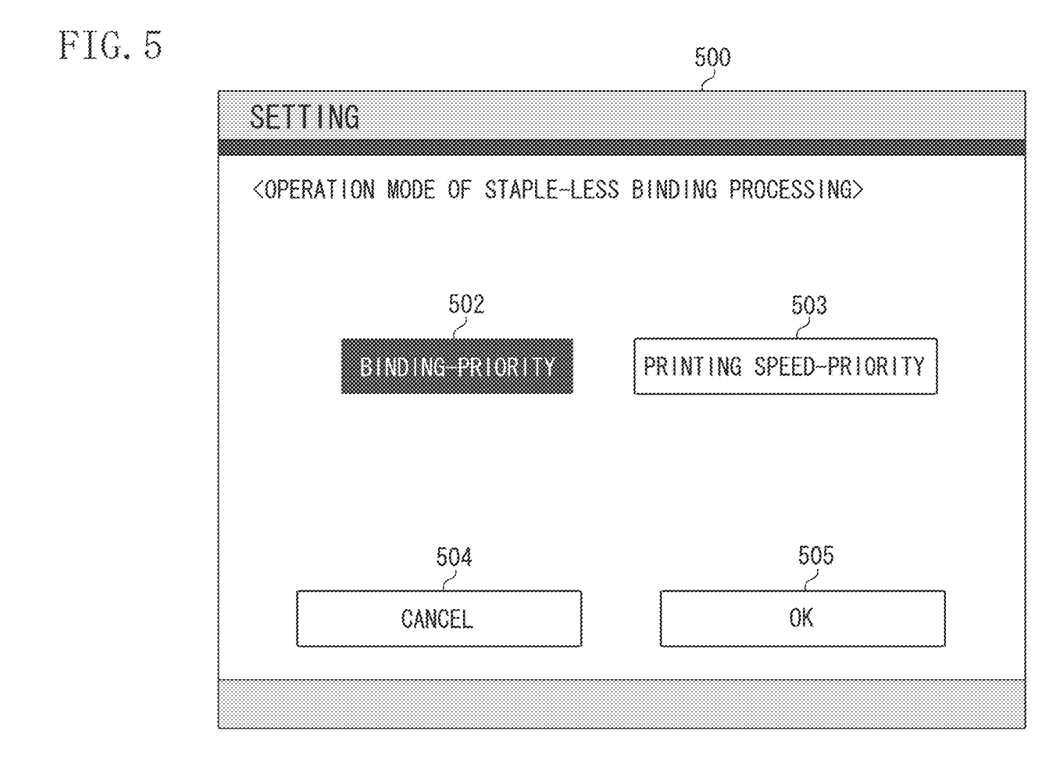
FIG. 5 is a diagram illustrating an operation screen displayed on the operation unit.

First, a setting of the MFP 101 will be described. FIG. 5 is a diagram illustrating an example of a setting screen of the MFP 101 displayed on the operation unit 116. A user of the MFP 101 can set a mode for executing the staple-less binding processing via a screen 500. A binding-priority key 502 is used for changing the mode to a mode which allows the user to start printing after confirming that the number of sheets to be printed is equal to or less than the upper limit number of sheets bindable by the staple-less binding processing. A printing speed-priority key 503 is used for changing the mode to a mode which allows the user to start printing the sheets before reading processing of all of the documents to be printed on the sheets is completed in order to improve the printing efficiency. The keys 502 and 503 are provided as exclusive keys which the user can select only one or the other.

An OK key 505 is used for applying change of the mode performed via the screen 500. Further, a cancel key 504 is used for cancelling the change of setting performed via the screen 500. A mode setting for executing the staple-less binding processing is stored in the RAM 113 or the storage 114 and is referred to as appropriate in the processing illustrated in the below-described flowcharts.

Figure 6:
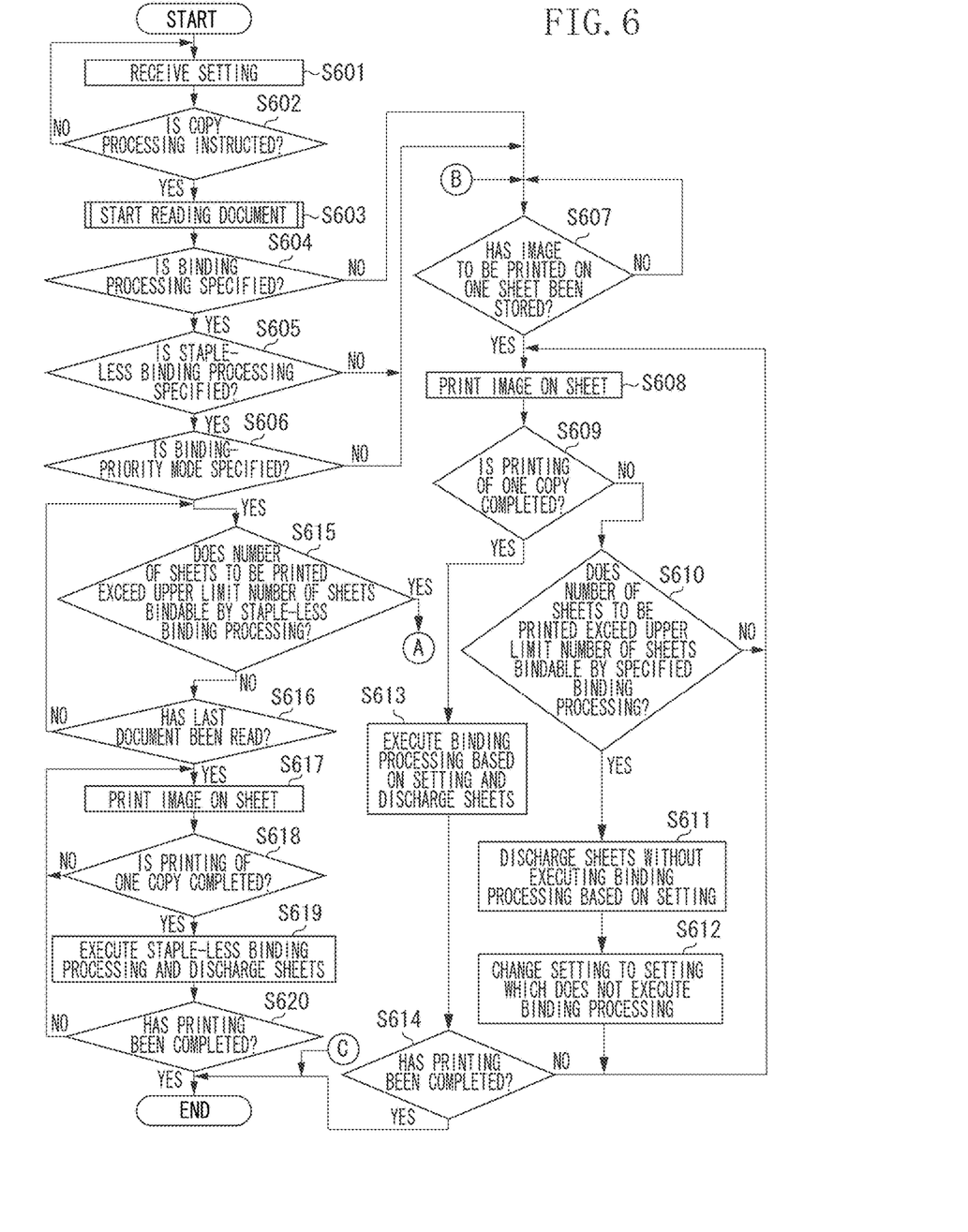
FIG. 6 is a flowchart illustrating a control method of printing processing.
Figure 7:
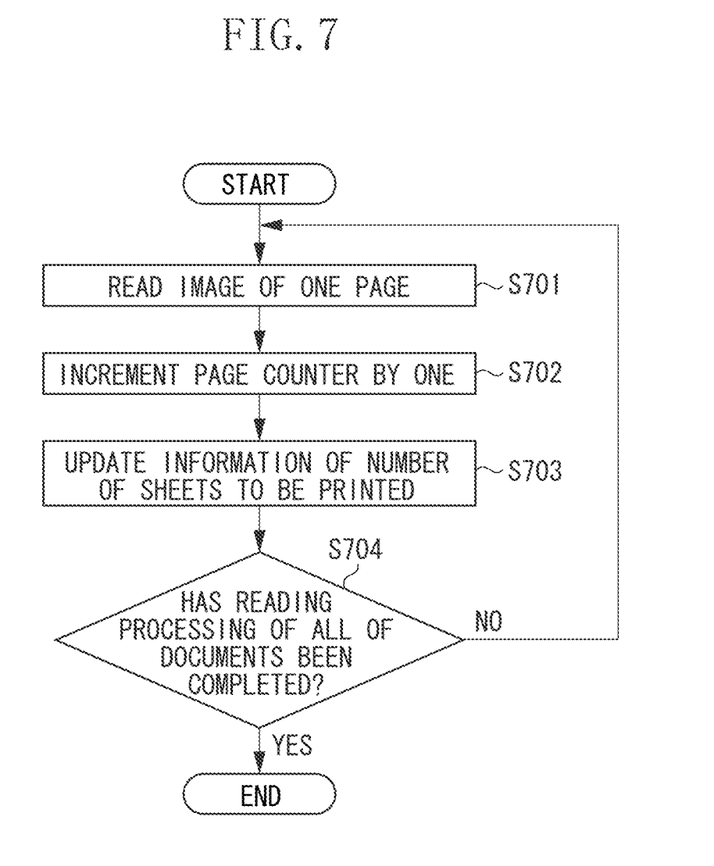
FIG. 7 is a flowchart illustrating a control method of printing processing.
Figure 8:
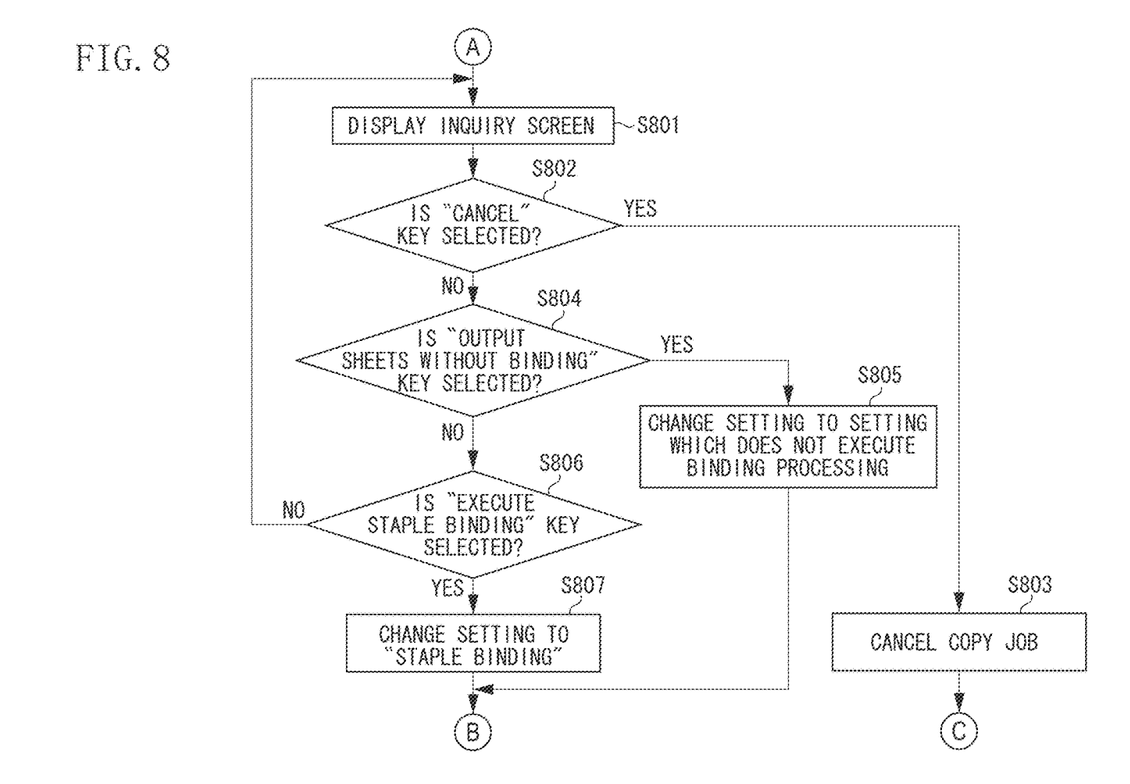
FIG. 8 is a flowchart illustrating a control method of printing processing.

A specific method for controlling the printing processing will be described with reference to flowcharts. FIGS. 6 to 8 are flowcharts illustrating the operations of the MFP 101 which are to be started when a copy function is selected by the user via a menu screen displayed when the MFP 101 is activated.

The CPU 111 of the MFP 101 realizes respective operations (steps) illustrated in flowcharts in FIGS. 6 to 8 by executing a control program stored in the ROM 112 or the storage 114.

In step S601, the CPU 111 receives a setting regarding the copy processing. Here, the user can perform various settings such as a copy number setting, a post-processing setting, a two-sided printing setting, and a page aggregation setting. In step S602, if the instruction for executing copy processing is received (YES in step S602), the processing proceeds to step S603. If the instruction for executing copy processing is not received (NO in step S602), the processing returns to step S601.

In step S603, the CPU 111 starts reading processing of documents. The reading processing of documents will be described in detail with reference to FIG. 7. In addition, the reading processing of documents in step S603 will be executed asynchronously and concurrently with the processing in step S604 and the subsequent steps. In other words, regardless of progress of the processing in step S604 and the subsequent steps, the reading processing is sequentially executed until the documents to be read have been read completely, while the processing in step 3604 and the subsequent steps is executed in concurrent with the reading processing.

Hereinafter, the reading processing will be described in detail with reference to FIG. 7. In step S701, the CPU 111 controls the reading unit 118 to read an image of one page. Specifically, the CPU 111 controls the ADF 300 to start conveying a document. The reading unit 118 generates an image of one page by reading the conveyed document, and stores the image in the storage 114. After the image of one page is generated, the processing proceeds to step S702.

In step S702, the CPU 111 increments the counter P by one. In addition, the counter P is a variable number for storing the number of images (i.e., the number of pages of read documents) stored in the storage 114.

In step S703, the CPU 111 updates information of the number of sheets to be printed based on the counter P and the print setting of the copy job. Description will be given by taking a specific example. Because an image of one page is printed on one sheet when one-sided printing is set to the print setting while page aggregation is not set thereto (i.e., one-in-one), a value of the counter P represents the number of sheets to be printed. Further, because an image of one page is printed for each of the front face and the back face of one sheet when two-sided printing is set while the page aggregation is not set thereto (i.e., one-in-one), a value "P/2" represents the number of sheets to be printed. Furthermore, because images of two pages are printed on a first face of one sheet when one-sided printing and the page aggregation of "two-in-one" are set thereto, a value "P/2" represents the number of sheets to be printed. Further, when the page aggregation of "N-in-one", e.g., "four-in-one" or "eight-in-one" is set thereto, a value "P/N" represents the number of sheets to be printed. When the two-sided printing and the page aggregation of "N-in-one" are set thereto, a value "P/(2N)" represents the number of sheets to be printed. After the information of the number of sheets to be printed is updated, the processing proceeds to step S704.

In step S704, the CPU 111 determines whether reading processing of all of the documents has been completed. If the CPU 111 determines that reading processing of all of the documents has been completed (YES in step S704), the CPU 111 stores a determination result indicating completion of the reading processing in the RAM 113 and ends the reading processing. On the other hand, if the CPU 111 determines that the reading processing has not been completed (NO in step S704), the processing returns to step S701, so that the CPU 111 reads a next document.

The processing in step S604 and the subsequent steps will be described with reference to FIG. 6 again. In step S604, the CPU 111 determines whether binding processing is specified as the print setting of the copy job. If the binding processing is specified (YES in step S604), the processing proceeds to step S605, and if the binding processing is not specified (NO in step S604), the processing proceeds to step S607.

In step S605, the CPU 111 determines whether staple-less binding processing is specified as the print setting of the copy job. If the staple-less binding processing is specified (YES in step S605), the processing proceeds to step S606, and if the staple-less binding processing is not specified (NO in step S605), the processing proceeds to step S607. In step S606, the CPU 111 determines whether a binding-priority mode is specified as a mode for executing the staple-less binding processing. The CPU 111 acquires the mode for executing the staple-less binding processing stored in the RAM 113 or the storage 114. If the acquired mode is "binding-priority" (YES in step S606), the processing proceeds to step S615, and if the acquired mode is not "binding-priority" but "printing speed-priority" (NO in step S606), the processing proceeds to step S607. In addition, the mode for executing the staple-less binding processing referred in step S605 is previously set to any of the modes via the screen 500 illustrated in FIG. 5.

In step S607, the CPU 111 determines whether an image to be printed on one sheet has been stored. At every predetermined interval (e.g., one second), the CPU 111 refers to the information of the number of sheets to be printed updated through the processing in step S703 executed asynchronously and concurrently. If the referred information of the number of sheets to be printed indicates "1" or more (YES in step S607), the processing proceeds to step S608, and if the referred information of the number of sheets to be printed indicates "0" (NO in step S607), the CPU 111 repeats the processing in step S607 until the number of sheets to be printed becomes "1" or more.

In step S608, the CPU 111 controls the printing unit 120 to print an image on a sheet. When the printing of one sheet has been completed, the processing proceeds to step S609. In step S609, the CPU 111 determines whether printing of one copy has been completed. If the printing of one copy has been completed (YES in step S609), the processing proceeds to step S613, and if the printing of one copy has not been completed (NO in step S609), the processing proceeds to step S610.

In step S610, the CPU 111 determines whether the number of sheets to be printed exceeds the upper limit number of sheets bindable by the binding processing specified as the print setting of the copy job. If binding processing is not specified as the print setting of the copy job, the CPU 111 determines that the number of sheets to be printed does not exceed the upper limit number of sheets bindable by the binding processing, and the processing returns to step S608. Further, if the staple binding processing is specified as the print setting of the copy job, the CPU 111 refers to the information of the number of sheets to be printed and determines whether the number of sheets to be printed exceeds the upper limit number of sheets bindable by the staple binding processing. If the number of sheets to be printed exceeds the upper limit number of sheets bindable by the staple binding processing (YES in step S610), the processing proceeds to step S611, and if the number of sheets to be printed does not exceed the upper limit number of sheets bindable thereby (NO in step S610), the processing returns to step S608. Further, if the staple-less binding processing is specified as the print setting of the copy job, the CPU 111 refers to the information of the number of sheets to be printed and determines whether the number of sheets to be printed exceeds the upper limit number of sheets bindable by the staple-less binding processing. If the number of sheets to be printed exceeds the upper limit number of sheets bindable by the staple-less binding processing (YES in step S610), the processing proceeds to step S611, and if the number of sheets to be printed does not exceed the upper limit number of sheets bindable thereby (NO in step S610), the processing returns to step S608.

In step S611, the CPU 111 discharges a sheet bundle to the discharge portion 207 without executing the binding processing based on the print setting. In step S612, the CPU 111 changes the print setting of the copy job to the setting which does not execute binding processing (i.e., release specification of binding processing), and the processing returns to step S608.

On the other hand, in step S613, the CPU 111 executes binding processing on the sheets as necessary based on the print setting, and discharges the sheets to the discharge portion 207. Here, if the binding processing is not specified as the print setting, the CPU 111 discharges the sheets without executing the binding processing.

In step S614, the CPU 111 determines whether printing has been completed. If printing of the set number of copies has not been completed (NO in step S614), the processing returns to step S608, and if printing of the set number of copies has been completed (YES in step S614), a series of copy processing is ended.

Through the processing in steps S607 to S614, the CPU 111 can start printing the sheets at a timing at which the image necessary for printing one sheet is stored. Further, if the number of sheets to be printed exceeds the upper limit number of sheets bindable by the binding processing during the printing processing, the CPU 111 can discharge the sheets without executing the binding processing.

Next, description will be given to the processing that is to be executed when the staple-less binding processing is specified while a mode of the staple-less binding processing is "binding-priority" (i.e., when "YES" in step S606).

In step S615, the CPU 111 determines whether the number of sheets to be printed exceeds the upper limit number of sheets bindable by the staple-less binding processing. At every predetermined interval (e.g., one second), the CPU 111 refers to the information of the number of sheets to be printed that is updated through the processing in step S703 executed asynchronously and concurrently. As a result of the reference, if the number of sheets to be printed exceeds the upper limit number of sheets bindable by the staple-less binding processing (YES in step S615), the processing proceeds to "A (step S801)" in FIG. 8. In step S801 and the subsequent steps, the CPU 111 makes an inquiry about execution of the copy job (details will be described below). On the other hand, as a result of the reference, if the number of sheets to be printed does not exceed the upper limit number of sheets bindable by the staple-less binding processing (NO in step S615), the processing proceeds to step S616.

In step S616, the CPU 111 determines whether reading processing of the documents has been completed. If a determination result indicating completion of the reading processing is stored in the RAM 113 (YES in step S616), the processing proceeds to step S617. On the other hand, if a determination result indicating completion of the reading processing is not stored in the RAM 113 (NO in step S616), the processing returns to step S615.

Through the processing in steps S615 and S616, the CPU 111 can start the printing processing in step S617 and the subsequent steps after confirming that the number of sheets to be printed is equal to or less than the upper limit number of sheets bindable by the staple-less binding processing.

In step S617, the CPU 111 controls the printing unit 120 to print an image on a sheet. When the printing of one sheet has been completed, the processing proceeds to step S618. In step S618, the CPU 111 determines whether printing of one copy has been completed. If the printing of one copy has been completed (YES in step S618), the processing proceeds to step S619, and if the printing of one copy has not been completed (NO in step S618), the processing returns to step S617.

In step S619, the CPU 111 controls the sheet processing unit 122 to execute the staple-less binding processing on the sheets by using the staple-less binding unit 214*b*. When the staple-less binding processing has been completed, the CPU 111 discharges the sheets to the discharge portion 207, and the processing proceeds to step S620. In step S620, the CPU 111 determines whether printing has been completed. If printing of the set number of copies has not been completed (NO in step S620), the processing returns to step S617, and if printing of the set number of copies has been completed (YES in step S620), the copy processing is ended.

Subsequently, with reference to the flowchart in FIG. 8, description will be given to the processing that is to be executed when the number of sheets to be printed exceeds the upper limit number of sheets bindable by the staple-less binding processing (i.e., when "YES" in step S615).

Figure 9:
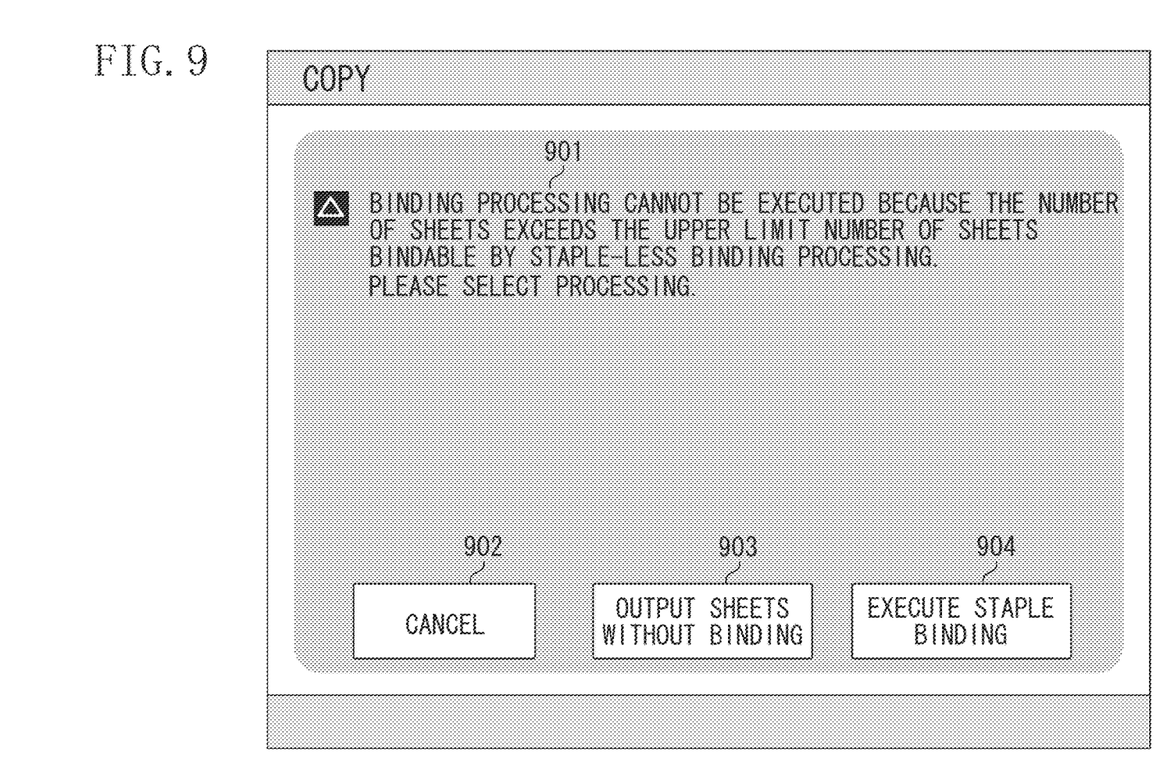
FIG. 9 is a diagram illustrating an operation screen displayed on the operation unit.

In step S801, the CPU 111 displays an inquiry screen (pop-up screen) regarding execution of the copy job. FIG. 9 is a diagram illustrating an example of the inquiry screen displayed on the operation unit 116 by the CPU 111. Information 901 notifies the user that the staple-less binding processing cannot be executed. Further, the information 901 also prompts the user to select processing to be executed on the copy job.

A cancel key 902 is used when the user cancels execution of the copy job. The user can cancel the copy job without outputting the printed materials by pressing the cancel key 902. An output sheets without binding key 903 is used when the user executes printing without executing the binding processing. Further, an execute staple binding key 904 is used when the user executes printing by changing the setting to the staple binding processing.

The user can determine the processing to be executed on the copy job by selecting any one of the keys 902 to 904.

Returning to FIG. 8 in step S802, the CPU 111 determines whether the user inputs an instruction for cancelling the copy job. If the cancel key 902 is selected (YES in step S802), the processing proceeds to step S803, and if the cancel key 902 is not selected (NO in step S802), the processing proceeds to step S804.

In step S803, the CPU 111 cancels execution of the copy job. In addition, if reading processing is asynchronously executed in step S603, the CPU 111 cancels that reading processing and discharges the document that is being conveyed through the ADF 300 to the discharge tray 322. When the cancellation processing of the copy job is completed, the processing proceeds to "C" in FIG. 6, so that a series of copy processing is ended.

In step S804, the CPU 111 determines whether the user inputs an instruction for outputting the sheets without binding. If the output sheets without binding key 903 is selected (YES in step S804), the processing proceeds to step S805, and if the output sheets without binding key 903 is not selected (NO in step S804), the processing proceeds to step S806. In step S805, the CPU 111 changes the setting of the copy job to a setting which does not execute binding processing, and the processing proceeds to the printing processing of "B (step S607)" and the subsequent steps in FIG. 6.

In step S806, the CPU 111 determines whether the user inputs an instruction for changing the setting to the staple binding. If the execute staple binding key 904 is selected (YES in step S806), the processing proceeds to step S807, and if the execute staple binding key 904 is not selected (NO in step S806), the processing returns to step S801, and the CPU 111 waits for the user instruction.

In step S807, the CPU 111 changes the setting regarding the post-processing of the copy job to the staple binding processing, and the processing proceeds to the printing processing of "B (step S607)" and the subsequent steps in FIG. 6.

In addition, the reading processing of the documents in step S603 is executed asynchronously and concurrently while the inquiry processing illustrated in steps S801 to S807 is being executed.

By executing the inquiry processing illustrated in steps S801 to S807, the CPU 111 can control the copy job according to the intension of the user.

As described above, in the present exemplary embodiment, when the staple-less binding processing is specified, the printing apparatus starts printing after confirming that the number of sheets used for printing does not exceed the upper limit number of sheets bindable by the staple-less binding processing. Accordingly, with respect to the staple-less binding processing, printing can be cancelled without outputting any of the sheets as it is assumed that a possibility of causing a situation in which the binding processing cannot be executed is high.

On the other hand, if the staple binding processing is specified or the binding processing is not specified, the printing apparatus starts printing regardless of the number of sheets used for printing. Accordingly, with respect to the staple binding processing, the printing processing can be executed without lowering the printing efficiency as it is assumed that a possibility of causing a situation in which the binding processing cannot be executed is lower than in the case of the staple-less binding processing.

OTHER EXEMPLARY EMBODIMENTS

In the first exemplary embodiment, although a copy function has been described as an example of the function for printing an image on a sheet, other embodiments are applicable to other printing controls. For example, another embodiment is applicable to printing control of stored documents (print data) stored in the MFP 101 or a server communicable with the MFP 101. In this case, the user operates the operation unit 116 to select a stored document to be printed. The processing in step S603 and the subsequent steps may be executed when the user selects a start key after selecting the stored document to be printed. In addition, in step S603, analysis processing of the print data is executed instead of the reading processing of documents.

An embodiment may be realized in such a manner that a program for realizing one or more functions according to the above-described exemplary embodiments is supplied to a system or an apparatus via a network or a storage medium, so that one or more processors in the system or the apparatus reads and executes the program. Further, the present invention can be also realized with a circuit (e.g., application specific integrated circuit (ASIC)) that realizes one or more functions.

According to the present exemplary embodiment, it is possible to provide a user-friendly printing apparatus capable of switching the print start timing according to the type of the binding processing.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-016362, filed Jan. 29, 2016, which is hereby incorporated by reference herein in its entirety.

What is claimed is:

1. A printing apparatus comprising:
   a printing unit configured to print images on sheets;
   a generation unit configured to generate images used for printing;
   a first binding unit configured to execute first binding processing on sheets;
   a second binding unit configured to execute second binding processing on sheets, which is capable of executing binding processing on sheets of a number greater than an upper limit number of sheets bindable by the first binding processing; and
   a control unit configured to control the printing unit to start printing on sheets after confirming that a number of sheets used for printing does not exceed the upper limit number of sheets bindable by the first binding processing in a case where the first binding processing is specified, and control the printing unit to start printing on sheets without confirming that a number of sheets used for printing does not exceed an upper limit number of sheets bindable by the second binding processing in a case where the second binding processing is specified.

2. The printing apparatus according to claim 1, wherein, in a case where a number of sheets used for printing does not exceed the upper limit number of sheets bindable by specified binding processing when the first binding processing or the second binding processing is specified, the control unit executes the specified binding processing on the sheets printed by the printing unit.

3. The printing apparatus according to claim 1 further comprising an inquiry unit configured to make a predetermined inquiry to a user,
   wherein, in a case where the control unit confirms that a number of sheets used for printing exceeds the upper limit number of sheets bindable by the first binding processing when the first binding processing is specified while images are being generated by the generation unit, the control unit makes an inquiry through the inquiry unit and executes predetermined control based on a user instruction with respect to the inquiry without making the printing unit start printing on the sheets.

4. The printing apparatus according to claim 3, wherein, in a case where a user instruction for cancelling processing is received with respect to the inquiry, the control unit stops printing of images generated by the generation unit.

5. The printing apparatus according to claim 3, wherein, in a case where a user instruction for outputting sheets without executing binding processing is received with respect to the inquiry, the control unit releases a specification of binding processing and starts printing on sheets through the printing unit.

6. The printing apparatus according to claim 3, wherein, in a case where a user instruction for binding sheets by changing a specification of the binding processing to the second binding processing is received with respect to the inquiry, the control unit changes the specification of binding processing to the second binding processing and starts printing on sheets through the printing unit.

7. The printing apparatus according to claim 1, wherein, in a case where a number of sheets used for printing exceeds the upper limit number of sheets bindable by the second binding processing when the second binding processing is specified, the control unit executes control of discharging the sheets printed by the printing unit without binding.

8. The printing apparatus according to claim 1 further comprising a reading unit configured to generate an image by reading a document,
wherein the generation unit generates an image used for printing based on the image generated by the reading unit.

9. The printing apparatus according to claim 8 further comprising a document conveyance unit configured to convey a document to the reading unit,
wherein the reading unit generates an image by reading a document conveyed by the document conveyance unit.

10. The printing apparatus according to claim 1, wherein the control unit determines a number of sheets used for printing based on at least a number of pages of images generated by the generation unit and a setting of two-sided printing.

11. The printing apparatus according to claim 1, wherein the printing unit determines a number of sheets used for printing based on at least a number of pages of the images generated by the generation unit and a setting of page aggregation of N-in-one, in which "N" is an integer of "1" or more.

12. The printing apparatus according to claim 1, wherein the first binding unit is a staple-less binding unit that executes binding processing without using a staple, and the second binding unit is a staple binding unit that executes binding processing by using a staple.

13. The printing apparatus according to claim 1,
wherein the first binding unit binds sheets by pressurizing the sheets to tangle fibers of the sheets with each other, and
wherein the second binding unit binds sheets by using a staple.

14. The printing apparatus according to claim 1 further comprising a storage unit configured to store a first value indicating an upper limit number of sheets bindable by the first binding processing and a second value indicating an upper limit number of sheets bindable by the second binding processing.

15. The printing apparatus according to claim 14 further comprising a changing unit configured to change the first value and the second value.

16. A control method of a printing apparatus including a printing unit configured to print images on sheets, a first binding unit configured to execute first binding processing on sheets, a second binding unit configured to execute second binding processing on sheets, which is capable of executing binding processing on sheets of a number greater than an upper limit number of sheets bindable by the first binding processing, the control method comprising:
generating an image used for printing; and
controlling the printing unit to start printing on sheets after confirming that a number of sheets used for printing does not exceed the upper limit number of sheets bindable by the first binding processing in a case where the first binding processing is specified, and controlling the printing unit to start printing on sheets without confirming that a number of sheets used for printing does not exceed an upper limit number of sheets bindable by the second binding processing in a case where the second binding processing is specified.

17. A non-transitory computer-readable storage medium storing a program that causes a computer to execute the control method of a printing apparatus according to claim 16.

18. A printing apparatus comprising:
a document holding unit configured to hold documents;
a document feeding unit configured to feed the documents held on the document holding unit one by one;
a reading unit configured to read images of the documents fed by the document feeding unit;
a printing unit configured to print images on sheets based on the images read by the reading unit;
a first binding unit configured to execute first binding processing on the sheets on which images are printed by the printing unit;
a second binding unit configured to execute second binding processing on the sheets on which images are printed by the printing unit, which is capable of executing binding processing on sheets of a number greater than an upper limit number of sheets bindable by the first binding processing; and
a control unit configured to control the printing unit to start printing on sheets after all of the documents held on the document holding unit is fed by the document feeding unit in a case where the first binding processing is specified, and control the printing unit to start printing on sheets before all of the documents held on the document holding unit is fed by the document feeding unit in a case where the second binding processing is specified.

19. The printing apparatus according to claim 18 further comprising an inquiry unit configured to inquire of a user about whether to change a specification of binding processing to the second binding processing in a case where a number of fed documents exceeds the upper limit number of sheets bindable by the first binding processing before all of the documents held on the document holding unit is fed by the document feeding unit when the first binding processing is specified.

* * * * *